United States Patent
Kachouh

(10) Patent No.: US 8,284,022 B2
(45) Date of Patent: Oct. 9, 2012

(54) MOTOR VEHICLE DOOR ARRANGEMENT

(75) Inventor: Checrallah Kachouh, Dortmund (DE)

(73) Assignee: Brose Schleisssysteme GmbH & Co., KG, Wuppertal (DE)

( * ) Notice: Subject to any disclaimer, the term of this patent is extended or adjusted under 35 U.S.C. 154(b) by 1283 days.

(21) Appl. No.: 11/613,352

(22) Filed: Dec. 20, 2006

(65) Prior Publication Data

US 2007/0146120 A1 Jun. 28, 2007

(30) Foreign Application Priority Data

Dec. 22, 2005 (DE) .................... 20 2005 020 140 U

(51) Int. Cl.
*B60R 25/00* (2006.01)
*G05B 19/00* (2006.01)
*G05B 23/00* (2006.01)
*H04B 1/00* (2006.01)

(52) U.S. Cl. ...................................................... 340/5.72
(58) Field of Classification Search .................. 340/5.72
See application file for complete search history.

(56) References Cited

U.S. PATENT DOCUMENTS

| | | | |
|---|---|---|---|
| 4,450,545 A * | 5/1984 | Kishi et al. ..................... 367/198 |
| 4,672,375 A * | 6/1987 | Mochida et al. ............. 340/5.72 |
| 4,862,640 A * | 9/1989 | Boyko et al. ..................... 49/213 |
| 5,117,217 A * | 5/1992 | Nykerk ..................... 340/426.23 |
| 5,389,920 A * | 2/1995 | DeLand et al. ............... 340/12.5 |
| 5,905,431 A * | 5/1999 | Mueller et al. ............. 340/426.17 |
| 6,542,071 B1 * | 4/2003 | Ohtsubo et al. .......... 340/426.28 |
| 6,838,976 B2 | 1/2005 | Mindl et al. |
| 6,895,316 B2 * | 5/2005 | Chen et al. ....................... 701/36 |
| 7,088,284 B2 * | 8/2006 | Young .............................. 342/27 |
| 7,106,171 B1 * | 9/2006 | Burgess ....................... 340/5.72 |
| 7,148,787 B2 | 12/2006 | Lucy et al. |
| 2001/0010491 A1 | 8/2001 | Marneweck et al. |
| 2001/0054952 A1 * | 12/2001 | Desai et al. .................. 340/5.72 |
| 2002/0196131 A1 * | 12/2002 | McCarthy et al. .......... 340/425.5 |
| 2003/0228879 A1 * | 12/2003 | Witkowski et al. ......... 455/550.1 |
| 2004/0070489 A1 * | 4/2004 | Ueda et al. ..................... 340/5.61 |
| 2004/0201277 A1 | 10/2004 | Hentsch et al. |
| 2004/0237458 A1 * | 12/2004 | Thiel et al. ................. 52/745.05 |
| 2004/0257200 A1 * | 12/2004 | Baumgardner et al. ..... 340/5.72 |

(Continued)

FOREIGN PATENT DOCUMENTS

DE 10038803 * 8/2000

(Continued)

*Primary Examiner* — Daniel Wu
*Assistant Examiner* — Mohamed Barakat
(74) *Attorney, Agent, or Firm* — Roberts Mlotkowski Safran & Cole, P.C.; David S. Safran

(57) ABSTRACT

A motor vehicle door arrangement with at least one motor vehicle door and a drive for motorized movement of the motor vehicle door from the closed position into the open position and from the open position into the closed position and with a control for triggering the drive, the control being assigned an optionally actuatable mobile part which the user generally carries and which interacts with the control means over a wireless transmission link when the user approaches the motor vehicle, enhanced actuation automatically carrying out opening and/or a closing as triggered by a predetermined process of use and without the necessity of actuating the mobile part. With respect to enhanced actuation, the control means, especially with the vehicle stopped, can be moved into the activated and deactivated states, and can be triggered by the predetermined usage process exclusively when the control means is in the activated state.

13 Claims, 3 Drawing Sheets

U.S. PATENT DOCUMENTS

| | | |
|---|---|---|
| 2005/0023858 A1* | 2/2005 | Bingle et al. .................... 296/76 |
| 2005/0285716 A1* | 12/2005 | Denison et al. ................ 340/5.2 |
| 2006/0031783 A1* | 2/2006 | Obradovich .................. 715/835 |
| 2006/0164208 A1* | 7/2006 | Schaffzin et al. ............ 340/5.64 |
| 2007/0146120 A1* | 6/2007 | Kachouh ...................... 340/5.72 |

FOREIGN PATENT DOCUMENTS

| | | | |
|---|---|---|---|
| DE | 10038803 | A1 | 2/2002 |
| DE | 10202329 | A1 | 7/2003 |
| DE | 1020047020426 | * | 4/2004 |
| DE | 103 40 592 | A1 | 5/2005 |
| DE | 102005017458 A1 | * | 11/2005 |
| DE | 102004052907 | A1 | 5/2006 |
| DE | 102004054134 | A1 | 5/2006 |
| EP | 0 908 589 | A2 | 4/1999 |
| EP | 1 043 205 | A1 | 10/2000 |
| GB | 2 426 102 | A | 11/2006 |
| WO | 2006 024399 | A1 | 3/2006 |

* cited by examiner

MOTOR VEHICLE DOOR ARRANGEMENT

BACKGROUND OF THE INVENTION

1. Field of the Invention

This arrangement relates to a motor vehicle door arrangement with at least one motor vehicle door or the like and a drive for motorized movement of the motor vehicle door from the closed position into the open position—opening process—and from the open position into the closed position—closing process—and with a control means for triggering the drive, the control means being assigned an optionally actuatable mobile part which the user generally carries and which interacts with the control means over a wireless transmission link when the user approaches the motor vehicle, enhanced actuation being designed for automatically carrying out an opening process and/or a closing process which can be triggered by a predetermined process of use and without the necessity of actuating the mobile part. The invention also relates to a control means for such a motor vehicle door arrangement.

2. Description of the Related Art

Motor vehicles are being increasing equipped nowadays with motorized enhanced functions which are intended to simplify operation. This relates especially to the motor vehicle door arrangement. The expression "motor vehicle door" should be understood comprehensively here. Side doors, the rear hatch, the trunk lid, the hood or the like are meant. Sliding doors are also encompassed by this expression.

In the known motor vehicle door arrangement underlying the invention (German Patent Application DE 103 16 306 A1; U.S. Patent Application Publication 2004/0201277 A1), it is provided that certain enhanced functions are automatically triggered when the user approaches. For this purpose, the user carries a mobile part which communicates with a control located in the motor vehicle over a wireless link. These enhanced functions are, for example, the motorized unlocking of a motor vehicle lock, motorized opening of a motor vehicle lock or the motorized opening or closing of the hatch of a motor vehicle which is hereinafter called "enhanced actuation". This enhanced actuation is also known from German Patent DE 10 2004 041 709 B3 (International Patent Application Publication WO 2006/024399 A1).

The problem in the enhanced actuation is fundamentally the fact that the user, in certain cases of triggering such a function, can be surprised; this entails major danger. One approach to increasing the user safety in enhanced actuation is shown by another known motor vehicle door arrangement (German Patent Application DE 100 38 803 A1). Here, the control means assigned to the motor vehicle door arrangement is equipped with a speech module so that the rear hatch can be opened or closed via speech input if the user is authorized for this. For authorization interrogation, the user carries a mobile part. The speech module enables the user to control the enhanced function of motorized opening and closing of the rear hatch, therefore enhanced actuation. But basically, there is the residual risk of unwanted opening of the rear hatch here, for example, when the user is located directly on the motor vehicle and the command word for opening the rear hatch—optionally accidently—is given by a third party without the user expecting automatic actuation.

In the described motor vehicle door arrangements, it is such that the enhanced actuation can be triggered without the necessity of actuating a mobile part, such as a remote control. Furthermore, for triggering, simply a predetermined usage process is necessary which can consist in that the user approaches the motor vehicle or the user delivers a speech command to the speech module.

The described enhanced actuation constitutes a major simplification for the user. This applies especially when, for example, after shopping for food, neither hand is free to actuate a remote control or the like for unlocking the motor vehicle lock or for opening the rear hatch. This same applies, for example, when the user is taking small children to the vehicle and accordingly does not have the opportunity to actuate the remote control by hand.

The problem in all these cases is that the user is at least partially deprived of control of the behavior of his vehicle by the enhanced actuation. This can lead to unexpected and possibly dangerous situations and to possible misuse by third parties.

SUMMARY OF THE INVENTION

The object of the invention is to embody and develop the known motor vehicle door arrangement such that operating safety is optimized in the enhanced actuation of a motor vehicle door, especially the rear hatch of a motor vehicle.

The aforementioned object is achieved in a motor vehicle door arrangement of the initially mentioned type wherein, as needed, the control means, especially with the vehicle stopped, can be moved into the activated state and into a deactivated state with respect to enhanced actuation, and wherein enhanced actuation can be triggered by the predetermined usage process solely when the control means is in the activated state.

What is important is to design the control means such that the enhanced actuation of the motor vehicle door can be activated or deactivated as needed. In the deactivated state, this enhanced actuation cannot be initiated by the above described predetermined utilization process. Enhanced actuation is to a certain extent blocked.

Thus, the user can control whether enhanced actuation of the motorized opening or closing of the motor vehicle door is to be automatically triggered or not. When the control means is deactivated in the aforementioned sense, misuse of the enhanced actuation can be reliably precluded.

In a preferred manner of implementing activation of the control means, the activation means can be actuated from the interior of the motor vehicle. This manner of implementing activation of the control means can be easily implemented since only one additional switch or button need be provided in the interior of the motor vehicle. However, it can also be advantageous for activation to take place by actuating the mobile part.

When the control means is activated, in a preferred configuration, a preferably electronic memory is set. Before the enhanced actuation is triggered, it must be checked whether the memory is set or not. If not, the triggering of enhanced actuation is blocked.

For the purposes of a simple configuration, the aforementioned memory is located in the part of the control means located in the vehicle. Especially high user-friendliness can be achieved by the memory being located in the mobile part. Then, specifically, only the mobile part is involved in activation. This has the advantage that activation can be undertaken although the mobile part is out of the range of the wireless transmission link to the vehicle-side control means. As the user and thus the mobile part approach the vehicle, the memory located in the mobile part is read out and enhanced actuation is released or blocked depending on the state of the memory. Therefore, if the user, when shopping, for example, standing at the checkout, notices that he will not have any hands free to actuate the mobile part, he can set the memory while still shopping. The enhanced actuation is then triggered depending on the configuration as the vehicle or the like is approached.

When there are several motor vehicle doors which can be actuated by a motor, in accordance with advantageous approach, separate activation of the control means for each motor vehicle door is possible. The user can therefore select whether the sliding door, the rear hatch, or a side door is to automatically open. This further increases the manageability of enhanced actuation by the user.

However, basically, it is conceivable for deactivation of the control means to take place in the same manner as activation. This could be, for example, switching back the switch which is optionally located in the interior of the vehicle. But, it is especially user-friendly if the control means automatically drops back into the deactivated state after a predetermined time expires. This precludes the control means from remaining unintentionally in the activated state when the user has forgotten to deactivate the control means.

Advantageous possibilities for implementing the triggering of enhanced actuation include an embodiment with proximity sensing. Here, it is provided that approaching or moving away from the vehicle by the mobile part and/or the user causes triggering of enhanced actuation.

In the preferred configuration, a detection area is assigned to the motor vehicle door which is to be actuated within the framework of enhanced actuation. Movement of the user and/or the mobile part into or out of the detection area is detected by the proximity sensing so that enhanced actuation is triggered accordingly. It is especially advantageous here if the detection area is essentially the surrounding area of the respective vehicle door. Thus, the respective vehicle door is only actuated on a dedicated basis when the user is in a corresponding predetermined area.

If there are several motor vehicle doors which can be actuated by a motor, it is advantageous if it can be detected by means of proximity sensing which of the motor vehicle doors the user is approaching or away from which of the motor vehicle doors the user is moving. Within the framework of enhanced actuation, then, only that motor vehicle door is moved by a motor which is affected accordingly by the respective movement of the user and/or of the mobile part.

In the preferred configuration, to trigger the enhanced actuation, there is a proximity sensor on the motor vehicle. This proximity sensor is preferably located in the lower region of the motor vehicle so that it can be actuated with a foot movement of the user. This is an especially advantageous version when unintentional opening or closing of the motor vehicle door is to be avoided. Similar safety can be achieved by providing a speech recognition module for triggering the enhanced actuation.

Another measure for avoiding malfunctions has an interior monitoring means, triggering of enhanced actuation being impossible when the user is in the interior of the motor vehicle and/or when the mobile part is in the interior of the motor vehicle.

Any automatic function which is associated with motorized movements leads to potential hazard to the user. Therefore, it is preferably provided that the control means is assigned a collision avoidance means. It can be used, at the same time, within the framework of a parking aid; this leads to an especially compact and economical configuration. Furthermore, the collision avoidance means can also be used within the framework of the triggering means; this in turn is accordingly advantageous with respect to compactness and cost.

Finally, preferred configuration can possess a passive entry function of a motor vehicle lock assigned to the motor vehicle door. This passive entry function causes the motor vehicle lock assigned to the respective motor vehicle door to be automatically unlocked when the user and/or the mobile part approaches, if the user is authorized. The user, in turn, carries the mobile part which has the corresponding authorization data in a data memory. When the user approaches the motor vehicle, first, a starting interval is initiated in which the control means is activated. Then, the authorization data stored in the data medium of the mobile part are read out and checked in an authorization check interval. After completion of the authorization check interval, and optionally, after actuation by the user, the motor vehicle lock is finally unlocked and optionally opened in an action interval. "Opening" of the motor vehicle lock here means that the motor vehicle door can then be transferred from the locked position into the open position. In a motor vehicle lock with a latch and ratchet, opening in the aforementioned sense corresponds to the lifting of the ratchet.

In another preferred configuration, the above described passive entry function is combined with the above described enhanced actuation of motorized opening or closing of the motor vehicle door. Here, it is provided that the triggering means intended for triggering the enhanced actuation within the framework of the passive entry function is used to trigger the starting interval and/or the action interval. This is logically consistent in that the passive entry function must precede the triggering of enhanced actuation in any case for motorized opening of the motor vehicle door in order to release the motorized opening of the motor vehicle door in a mechanical respect. Alternatively or in addition, the triggering means can, in turn, be used within the framework of a parking aid.

The above described control means has independent importance independent of its use the motor vehicle door arrangement.

The invention is detailed below with reference to the accompanying drawings which show an embodiment.

DETAILED DESCRIPTION OF THE INVENTION

Figure 1:
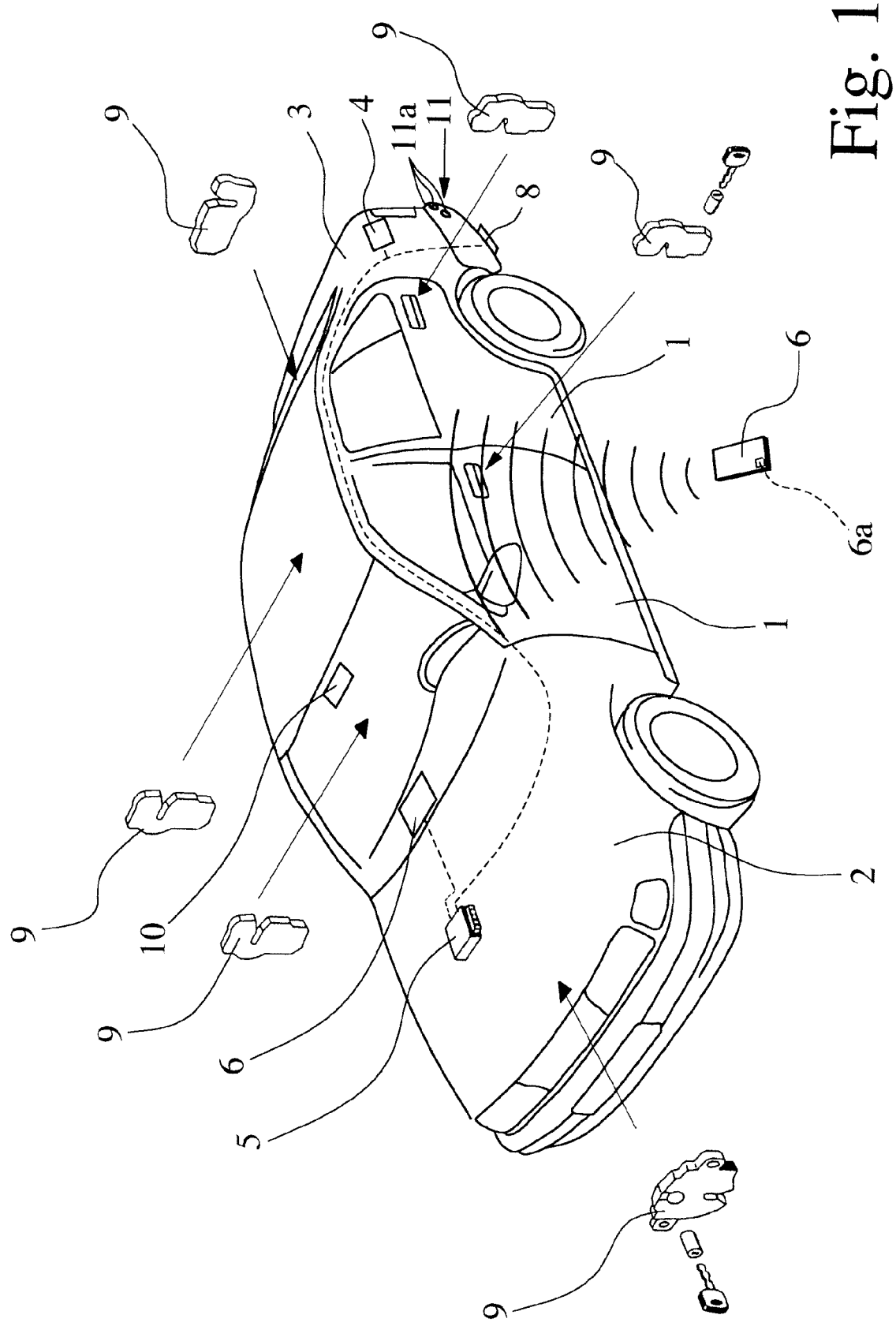
FIG. 1 shows in a schematic and perspective view a motor vehicle with a motor vehicle door arrangement in accordance with the invention.

The motor vehicle shown in FIG. 1 is equipped with a motor vehicle door arrangement in accordance with the invention which has four side doors 1, a hood 2 and a trunk lid 3. Depending on the configuration, instead of a pivoting side door, there could also be a sliding door or the like. The side doors 1, the hood 2, the trunk lid 3 and a sliding door which may be present are each a motor vehicle door in this sense. All of these motor vehicle doors 1, 2, 3 can fundamentally be equipped with a drive for motorized movement. The approach in accordance with the invention is explained below using the trunk lid 3 of the motor vehicle. This should not be understood in a limiting manner.

Figure 3:
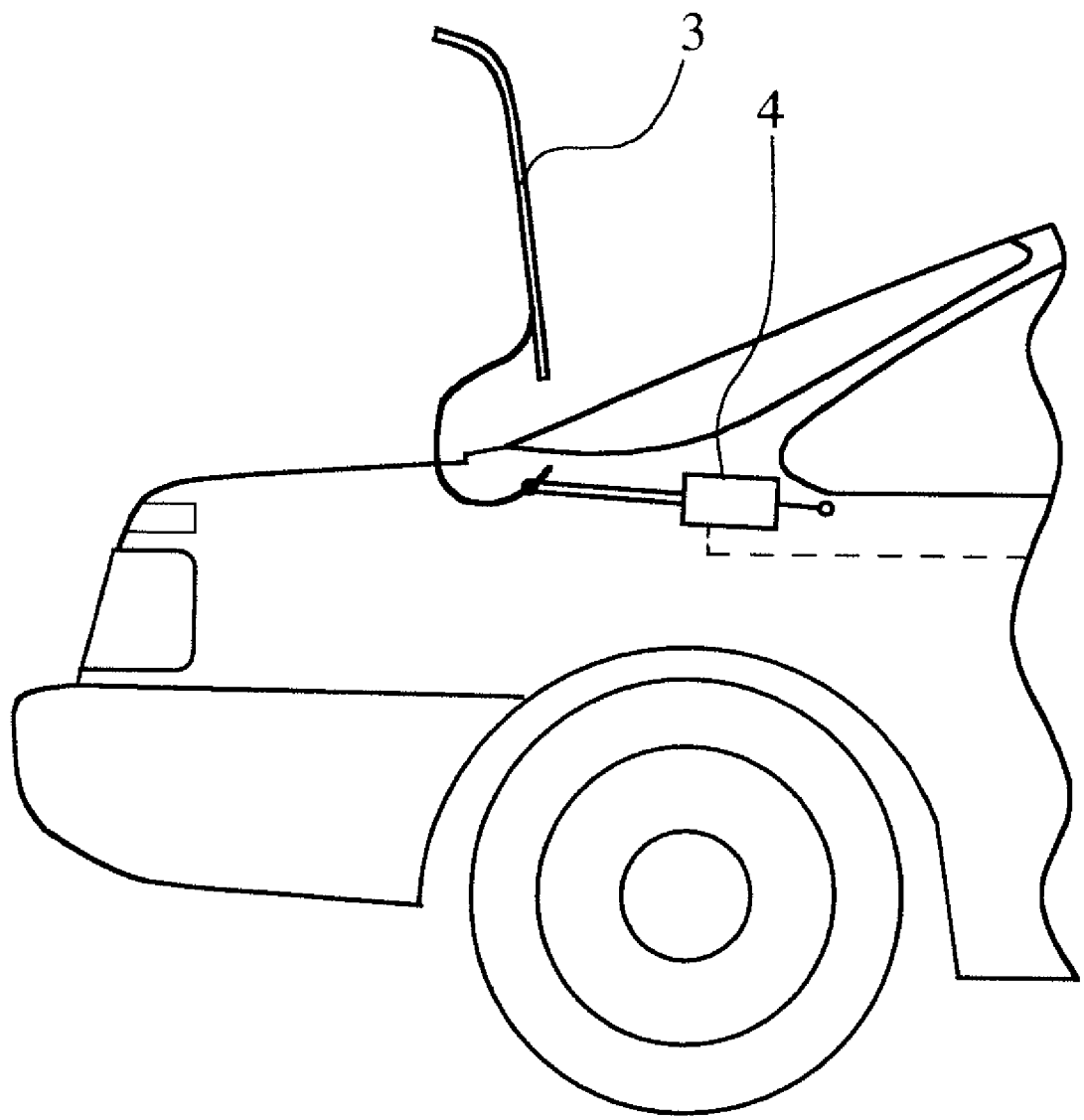

The drive 4 shown in FIG. 3 is used for motorized movement of the lid 3 from the closed position into the open position; this is hereinafter called the "opening process." Furthermore, the drive 4 is used for motorized movement of the lid 3 from the open position into the closed position; this is called the "closing process" below. Furthermore, there is a control means 5 for triggering the drive 4. Here, control means 5 can be a central control. However, it is also conceivable for there to be a decentralized control structure in which each individual drive which may be present is assigned its own control means 5.

The mobile part 6 which the user of the vehicle generally carries interacts with the control means 5 over a wireless transmission link when the user approaches the motor vehicle. The wireless transmission link is preferably a radio transmission link or an infrared transmission link. This interaction between the mobile part 6 and the control means 5 generally comprises an authorization check interval in order to block or release the triggering of the enhanced actuation, therefore automatic execution of an opening process and/or a closing process.

Here, it is especially advantageous that enhanced actuation can be initiated by a predetermined process of use and without the necessity of manual actuation of the mobile part 6. For example, the enhanced actuation can be initiated by the user simply approaching the motor vehicle. The lid 3 would then automatically open when the user approaches the vehicle. This is explained below.

It is important here that the control means 5 can be moved into the activated state and into the deactivated state with respect to enhanced actuation as needed, and that enhanced actuation can be triggered by the above addressed predetermined process of use solely when the control means 5 is in the activated state. As long as the control means 5 is not in the activated state, the enhanced actuation of the lid 3 is not possible. Thus, it can be easily precluded that the enhanced actuation is triggered without this being expected by the user.

There is activation or deactivation of the control means 5 as needed in the aforementioned sense preferably with the vehicle stopped, therefore, in the parked state. It will generally be such that the execution of enhanced actuation with the engine running, optionally with the ignition on, is generally blocked in order to prevent unwanted opening of the motor vehicle door 1, 2, 3 while driving.

In order to prevent unauthorized access to the motor vehicle door arrangement, it is preferably provided that the mobile part 6 has a data memory 6a which contains authorization data. An authorization check interval can be carried out over the wireless transmission link by the control means 5, in which the authorization data are read out from the mobile part 6 and checked with regard to user authorization. Enhanced actuation can be triggered accordingly solely after a successful authorization check interval, therefore when there is user authorization.

To activate the control means 5, preferably there is an activation means 7. Optionally, the activation means 7 can also be used to deactivate the control means 5. This is explained below. It is advantageous if the activation means allows activation and deactivation of the control means 5 as needed, largely independently of the control state of the motor vehicle otherwise.

In a version which is simple to implement, it is provided that the activation means 7 can be actuated from the interior of the vehicle. In this connection, the activation means 7 in the interior of the motor vehicle can have a switch or a button. Here, a series of possible actuation elements can be used.

However, it is also possible for the activation means 7 to be actuated by actuating the mobile part 6. Then, it is preferably such that the mobile part 6 for actuating the activation means 7 sends a corresponding activation signal to the control means 5 or to the activation means 7 via the wireless transmission link. This makes activation of the control means 5 for the user especially user-friendly.

To activate the control means 5, preferably there is an electronic memory which is set when the control means 5 is activated. Triggering of enhanced actuation is then exclusively possible with the memory set beforehand. Otherwise triggering of enhanced actuation is blocked.

The aforementioned memory is located in the part of the control means 5 located in the vehicle in a preferred configuration. The arrangement of the memory in the mobile part 6 offers special advantages, as was explained in the Summary part of this specification. The memory located in the mobile part 6 can also be made as a mechanical memory, for example, as a simple switch, in one especially economical version.

If there are several motor vehicle doors 1, 2, 3 which can be activated by motor, it is advantageous that activation of the control means 5 in the aforementioned sense can take place separately for each motor vehicle door 1, 2, 3 so that when enhanced activation is carried out, only the motor vehicle door 1, 2, 3 for which the control means 5 was activated beforehand is moved by the motor. This applies especially when two side doors, especially two sliding doors, can be actuated by a motor on both sides of the motor vehicle. Thus, the user can choose which of the two motor vehicle doors is to automatically open within the framework of enhanced actuation. The activation means 7 need then make available the corresponding choices.

There are various possibilities for deactivation of the control means 5. In an especially preferred configuration, the activated control means 5 remains in the activated state only for a predetermined time, and after expiration of the predetermined time, drops back into the deactivated state. However, fundamentally, deactivation can be produced in the same manner as activation, for example, by moving a switch located in the interior of the motor vehicle. In any case, it will be advantageous for the control means 5 to be shifted into the deactivated state after carrying out enhanced actuation.

As soon as the control means 5 has been activated, triggering of enhanced actuation is released. For initiation of enhanced actuation, the control means 5 is assigned a triggering means 8 which is located on the vehicle. Various versions for the configuration of the triggering means 8 are conceivable.

Figure 2:
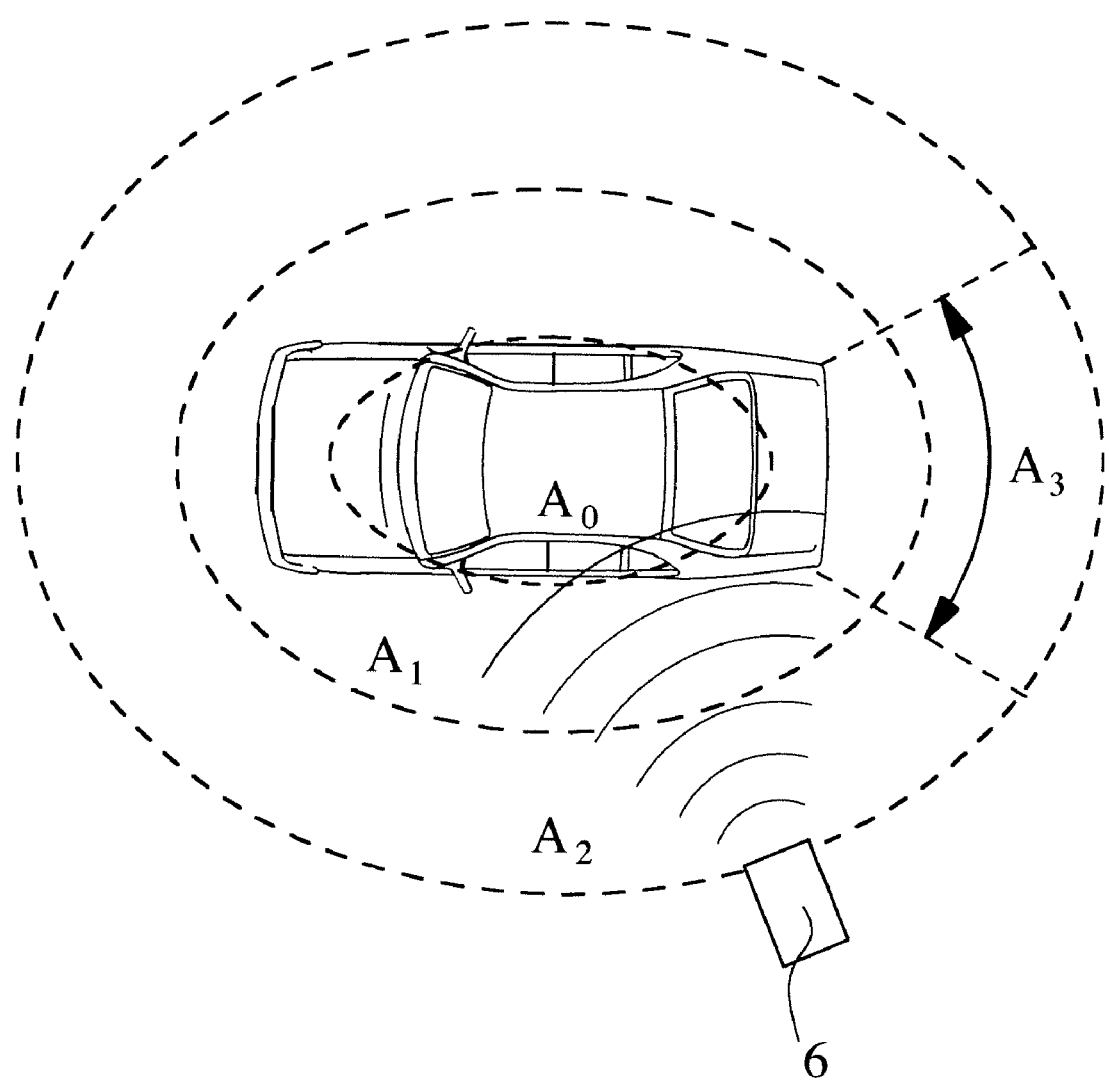
FIG. 2 is a view of the motor vehicle shown in FIG. 1 from above and FIG. 3 is a side view of the rear section of the motor vehicle shown in FIG. 1.

In a preferred configuration, the triggering means 8 has proximity sensing, the process of use by which the enhanced actuation is triggered by the mobile part 6 being as the user moves closer or farther away from the vehicle. Therefore, the change of the position of the mobile part 6 is determined in order to decide whether the motor vehicle door 1, 2, 3 is to be opened or closed by a motor. Here, it is advantageous to divide the surrounding region of the motor vehicle into different distance regions $A_0, A_1, A_2, A_3$, as is shown in FIG. 2.

In the simplest version, it is provided that information about the distance of the mobile part 6 from the vehicle can be obtained via the reception level of the radio signal. However, basically, also distance sensors can be used with sensor signals which provide information about the position of the user. Ultrasonic sensors or the like are also possible to use here.

With respect to avoiding the unwanted triggering of enhanced actuation, it is especially advantageous if the motor vehicle door 1, 2, 3 to be activated within the framework of enhanced actuation is assigned a detection range. By means of proximity sensing, it is then detected whether the user and/or the mobile part 6 is located in the detection region so that enhanced actuation is accordingly triggered. In the illustrated and preferred embodiment, there is a detection region $A_3$ which is assigned to the trunk lid 3. The enhanced actuation of the trunk lid 3 is carried out after a completed authorization check interval only when the user is in the detection region $A_3$, when the probability is therefore high that enhanced actuation is also desirable. This is specifically not the case when the user approaches the motor vehicle only in order to get into the vehicle.

In the case of several motor vehicle doors 1, 2, 3 which can be actuated by a motor, it is preferably provided that, by means of proximity sensing, it can be detected which of the motor vehicle doors 1, 2, 3 is affected by the respective movement of the user, and thus, can be moved by a motor within the framework of enhanced actuation. Therefore, it must be determined first from which direction the user is approaching the vehicle. For the case in which there are several differently aligned radio antennas for communication with the mobile part 6, based on the respective reception level, it can be easily determined in which antenna region the user with the mobile part 6 is located. In particular, the direction of movement can be recognized from radio antennas which are preferably networked with one another in this system. If the user, for example, is approaching the trunk lid 3 of the vehicle, the reception level detected by the radio antenna located in this region will be especially high, so that as a result the trunk lid 3 is opened by a motor. Here, accordingly, several detection regions are implemented in the aforementioned sense.

In another preferred configuration, it is provided that the triggering means 8 has a proximity sensor by which the triggering means 8 can be actuated and enhanced actuation can be triggered. In an especially preferred configuration, the proximity sensor is located in the lower region of the motor vehicle and can be actuated with a foot movement of the user. This is shown in FIG. 1. However, it can also be provided that the proximity sensor is located on the door handle of the respective vehicle door 1, 2, 3.

In another preferred configuration, the triggering means 8 has a speech recognition module, enhanced actuation being triggerable by a speech input of the user who is located outside the motor vehicle.

It should be pointed out that other possible embodiments of the triggering means 8 are possible. It is important, first of all, that activation and deactivation of the control means 5 are provided in the above described manner.

In order to further reduce the probability of a malfunction, in another preferred configuration, there is interior monitoring 10, the actuation of the triggering means 8 not being possible when the user is in the interior of the motor vehicle and/or the mobile part 6 is in the interior of the motor vehicle. Therefore, execution of enhanced actuation is blocked in exactly the same manner as in the case of a deactivated control means 5. Interior monitoring 10 can be implemented via evaluation of the radio signal level between the control means 5 and the mobile part 6, but also by additional proximity sensors or the like.

In order to reduce the accident risk in automatic movement of the motor vehicle door 1, 2, 3 within the framework of enhanced actuation, the control means 5 is preferably assigned a collision avoidance means 11. For this purpose, the collision avoidance means 11 has at least one sensor 11a which is preferably assigned to a parking aid. Here, generally, several sensors 11a are used which are aligned differently. The sensor 11a or sensors 11a of the collision avoidance means 11 can also be used, at the same time, within the framework of the triggering means 8.

Conventionally, the motor vehicle door 1, 2, 3 is equipped with a motor vehicle lock 9, the motor vehicle lock 9 here, preferably, being unlockable within the framework of the passive entry function. This means that when the mobile part 6 approaches the motor vehicle, a starting interval with a subsequent authorization check interval is carried out. After successful execution of the authorization check interval and optionally after actuation by the user, the motor vehicle lock 9 is then unlocked and optionally opened in an action interval. This was described in the Summary part of the specification.

In an especially preferred embodiment, the passive entry function is combined with the above described enhanced actuation. This means that the triggering means 8, especially the proximity sensing of the triggering means 8, is also used within the framework of the passive entry function for triggering the starting interval and/or the action interval. Here, it is provided that, first of all, the passive entry function is traversed and that, then, preferably motorized opening of the motor vehicle door 1, 2, 3 takes place. This is especially advantageous if, by means of proximity sensing, different distance regions can be detected. Then, when the user approaches into distance region $A_2$ (FIG. 2), first, the passive entry function with unlocking and opening of the motor vehicle lock 9 can proceed. Upon further approach into distance region $A_1$ (FIG. 2), then triggering of enhanced actuation takes place, therefore motorized opening of the motor vehicle door 1, 2, 3, if the authorization check interval has been successfully traversed. Upon further approach, finally, the collision avoidance means which may be present is activated which can be combined, as explained above, in turn, with the triggering means 8. The function of a parking aid can also be implemented within the framework of this integrated arrangement.

It can be taken from the aforementioned statements that the function of triggering enhanced actuation, the passive entry function, the collision avoidance function and the function of a parking aid can be combined completely or at least in part. This means that, in the implementation of these functions, the same sensors and/or on the same control means are accessed. An advantageous combination here is especially the combination of the function of triggering enhanced actuation with the function of a parking aid.

It has already been pointed out that the motor vehicle door 1, 2, 3 can be made as a side door, sliding door, rear hatch, a hood or the like. The approach in accordance with the invention can fundamentally be applied to all motor vehicle doors which can be actuated by a motor.

According to another teaching which acquires independent importance is that the above described control means 5 can be used independent of the door arrangement.

The invention claimed is:

1. Motor vehicle door arrangement, comprising:
   at least one motor vehicle door,
   a drive for motorized movement of the motor vehicle door from the closed position into an open position in an opening process and from the open position into a closed position in a closing process,
   control means for triggering the drive in an enhanced actuation that automatically carries out at least one of said opening process and said closing process at least in response to a predetermined user activity, the control means having a vehicle located part and a mobile part,
   an electronic memory associated with the control means, the electronic memory being settable in response to activation of the control means and being located in the mobile part of the control means which a user is able to carry, and
   a wireless transmission link for communicating the vehicle located part of the control means with the mobile part of the control means, wherein the control means is movable into an activated state and into a deactivated state with respect to enhanced actuation, the control means being movable into the activated state by manually actuating said mobile part, wherein the mobile part is activatable beforehand when the mobile part is out of the range of the vehicle located part of the control means, wherein the vehicle located part of the control means is able to read out the electronic memory located in the mobile part of the control means via the wireless transmission link as the user with the mobile part approaches the vehicle so as to release or block enhanced actuation depending on the read out from the memory, and wherein enhanced actuation is triggerable by the predetermined user activity without the necessity of manual actuation of the mobile part solely when the memory has been set beforehand so as to place the mobile part of the control means is in the activated state, the control means being shifted into the deactivated state after carrying out of the enhanced actuation and wherein the control means, if not deactivated due to carrying out of the enhanced actuation, is adapted to remain in the activated state only for a predetermined time and after expiration of the predetermined time to drop back into the deactivated state.

2. Motor vehicle door arrangement as claimed in claim 1, wherein the electronic memory of the mobile part contains authorization data, wherein the control means is adapted to perform an authorization check interval over the wireless transmission link, and wherein the enhanced actuation is triggerable solely after a successful completion of said authorization check interval.

3. Motor vehicle door arrangement as claimed in claim 1, wherein the activation means is also actuatable from the interior of the motor vehicle.

4. Motor vehicle door arrangement as claimed in claim 3, wherein the activation means comprise a switch or a button in the interior of the motor vehicle.

5. Motor vehicle door arrangement as claimed in claim 1, wherein said least one motor vehicle door comprises a plurality of motor vehicle doors which are operable by a respective motor, and wherein each of the motor vehicle doors is individually operable by activation of the control means so that, when enhanced activation is carried out, only the motor vehicle door for which the control means was activated beforehand is moved by the respective motor.

6. Motor vehicle door arrangement as claimed in claim 1, further comprising a triggering means for initiation of enhanced actuation, the triggering means being located on the vehicle and operatively associated with the control means.

7. Motor vehicle door arrangement as claimed in claim 6, wherein said predetermined user activity comprises the user moving toward or away from the vehicle in a defined manner and wherein the triggering means comprises a proximity sensing means for sensing the movement of the user toward or away from the vehicle in the defined manner.

8. Motor vehicle door arrangement as claimed in claim 7, the defined manner in which the user moves toward or away from the vehicle that is sensed by the proximity sensing means is whether the user is moving into a detection region assigned to a particular motor vehicle door which is to be actuated with respect to enhanced actuation or is moving out of said detection region.

9. Motor vehicle door arrangement as claimed in claim 7, wherein said at least one motor vehicle door comprises a plurality of doors, each of which can be actuated by a respective motor, and wherein the proximity sensing means is adapted for determining which of the motor vehicle doors is to be actuated with respect to enhanced actuation is to be actuated with respect to enhanced actuation for movement by the respective motor in response to movement of the user with respect to at least one of several detection regions.

10. Motor vehicle door arrangement as claimed in claim 6, wherein the triggering means comprises a proximity sensor and wherein the proximity sensor is located on a door handle of the motor vehicle door.

11. Motor vehicle door arrangement as claimed in claim 6, wherein the triggering means comprises a speech recognition module and wherein enhanced actuation is triggerable by speech input of the user located outside the motor vehicle.

12. Motor vehicle door arrangement as claimed in claim 1, wherein the at least one motor vehicle door comprises at least one of a side door, a sliding door, a rear hatch, and a hood.

13. Motor vehicle door arrangement as claimed in claim 6, further comprising an interior monitoring means for preventing actuation of the triggering means when the user is in the interior of the motor vehicle, wherein said interior monitoring means is responsive to at least one of the engine and the ignition being on.

* * * * *

UNITED STATES PATENT AND TRADEMARK OFFICE
CERTIFICATE OF CORRECTION

PATENT NO.        : 8,284,022 B2                                              Page 1 of 1
APPLICATION NO.   : 11/613352
DATED             : October 9, 2012
INVENTOR(S)       : Checrallah Kachouh It is certified that error appears in the above-identified patent and that said Letters Patent is hereby corrected as shown below:

Claim 1, Column 9, line 19, after first "control means" delete "is".

Signed and Sealed this
Eighteenth Day of December, 2012

David J. Kappos
*Director of the United States Patent and Trademark Office*